United States Patent
Barho et al.

(10) Patent No.: US 9,500,854 B2
(45) Date of Patent: Nov. 22, 2016

(54) BEAM STEERING MIRROR DEVICE

(71) Applicant: Airbus DS GmbH, Taufkirchen (DE)

(72) Inventors: Reiner Barho, Salem (DE); Manfred Schmid, Immenstaad (DE); Harald Langenbach, Salem (DE)

(73) Assignee: Airbus DS GmbH, Taufkirchen (DE)

( * ) Notice: Subject to any disclaimer, the term of this patent is extended or adjusted under 35 U.S.C. 154(b) by 16 days.

(21) Appl. No.: 14/533,476

(22) Filed: Nov. 5, 2014

(65) Prior Publication Data
US 2015/0124305 A1 May 7, 2015

(30) Foreign Application Priority Data
Nov. 6, 2013 (EP) .................................... 13005223

(51) Int. Cl.
*G02B 26/08* (2006.01)
*G02B 7/182* (2006.01)
*G02B 27/64* (2006.01)

(52) U.S. Cl.
CPC ......... *G02B 26/0816* (2013.01); *G02B 7/1821* (2013.01); *G02B 7/1828* (2013.01); *G02B 27/644* (2013.01)

(58) Field of Classification Search
CPC .............. G02B 26/105; G02B 26/0816; G02B 7/1828; G02B 7/1821; G02B 26/085; G02B 26/101; G02B 27/644; G02B 26/0841
See application file for complete search history.

(56) References Cited

U.S. PATENT DOCUMENTS

| | | | |
|---|---|---|---|
| 6,188,502 | B1 | 2/2001 | Aoki |
| 2002/0181839 | A1 | 12/2002 | Brown et al. |
| 2009/0097144 | A1 | 4/2009 | Oehlke et al. |
| 2009/0195899 | A1 | 8/2009 | Kersten et al. |

FOREIGN PATENT DOCUMENTS

EP 2 085 803 A1 8/2009

*Primary Examiner* — James Phan
(74) *Attorney, Agent, or Firm* — Crowell & Moring LLP

(57) ABSTRACT

A beam steering mirror device includes a mirror having an optical part with a reflecting or optical surface and a mirror body. The optical part is essentially thermally de-coupled from the body. A biaxial suspension of the mirror body has two rotation axes arranged essentially perpendicular with respect to each other and being located in a common plane. The suspension includes a set of four flexible pivots with a pair of pivots assigned to each rotation axis. The mirror is arranged with regard to the biaxial suspension such that its center of mass is approximately located in the intersection point of the two rotation axes. The device also includes motors for moving of the mirror body around the two rotation axes, sensors for determining the tilting angle of the mirror, and a housing for the mirror, the biaxial suspension, the motors and the sensors.

8 Claims, 3 Drawing Sheets

BEAM STEERING MIRROR DEVICE

CROSS-REFERENCE TO RELATED APPLICATIONS

This application claims priority under 35 U.S.C. §119 to European patent application 13 005 223.6-1562, filed Nov. 6, 2013, the entire disclosure of which is herein expressly incorporated by reference.

TECHNICAL FIELD

Exemplary embodiments of the invention relate to a beam steering mirror device, which is particularly suited for laser-based terminals or payload.

BACKGROUND

A beam steering mirror device is used to steer optical or infra-red beams, and can be used in diverse applications spanning from space assets to industrial instrumentation. For example, it is a key component for laser-based terminals or payloads, where information is transmitted over large distances by laser beams between for example space-born terminals such as communication satellites.

Existing and future laser-based communication terminals or payloads require a fine steering mechanism (FSM), which allows steering with a high precession and at a high control bandwidth larger than the 1 kilohertz (kHz) range at comparably large rotation angels.

SUMMARY OF INVENTION

Exemplary embodiments of the present invention are directed to a beam steering mirror device with a FSM, which fulfils these requirements.

An embodiment of the invention relates to a beam steering mirror device comprising a mirror comprising an optical part with a reflecting or optical surface and a mirror body, wherein the optical part is essentially thermally de-coupled from the body, and a biaxial suspension of the mirror body having two rotation axes being arranged essentially perpendicular with respect to each other and being located in a common plane, wherein the suspension comprises a set of four flexible pivots with a pair of pivots assigned to each rotation axis, wherein the mirror is arranged with regard to the biaxial suspension such that its center of mass is approximately located in the intersection point of the two rotation axes, further comprising motors for moving of the mirror body around the two rotation axes, sensors for determining the tilting angle of the mirror, and a housing for the mirror, the biaxial suspension, the motors and the sensors. The inventive design of the beam steering mirror device allows not only steering with a high precision and at a control bandwidth larger than 1 kHz, but enables also a steering around two axes. With the four flexible pivots, dedicated and well defined rotation axes of the mirror can be realized.

The optical part may have a mushroom-shaped isostatic design on the side opposite to the reflecting or optical surface and may be coupled with this side to the mirror body. This design significantly avoids transfer of thermal disturbances due to temperature variation or gradients from the mirror body to the optical surface.

The mirror body may carry four motor magnets, each forming a part of one of the four motors. Thus, the mirror body can move unaffected by any motor cabling.

The motor stators may be mounted in the housing with each motor stator located opposite to the one of the four motor magnets. For example, the motor stators can be fixed in corners of the housing while the rotor magnets are fixed at the mirror body. The motors can move the mirror about its flexible pivot suspension. Thus, a compact design of the beam steering mirror device can be obtained.

The motor magnets may be spherically convex shaped (ball shaped) and the motor stators may be concave shaped (ball shaped), and the motor magnets are pivot-suspended and oriented with respect to the motor stators. The shapes of the motor magnets comply with the shapes of the motor stators so that non-linearity effects due to air gap variations over the rotation angle of the motors can be avoided, or at least reduced for all combinations of rotation movement.

Two motors are respectively provided for motion of the mirror body around an axis may be coupled in series. This allows reducing or avoiding lateral forces occurring during the operation, so that only a torque around the center of rotation defined by the rotation axes is generated.

Furthermore, four sensors may be provided, and the four sensors may be arranged in line with the motors in the housing, and the four sensors may be eddy current sensors and temperature compensated, and respective two sensors provided for determining the tilting angle of the mirror around an axis can also be operated in a differential mode.

The mirror is made from beryllium or similar material (AlBeMet). Such a lightweight mirror allows increasing the control bandwidth of the device.

A further embodiment of the invention relates to a laser-based terminal or payload comprising a beam steering mirror device of the invention and as described herein.

These and other aspects of the invention will be apparent from and elucidated with reference to the embodiments described hereinafter.

The invention will be described in more detail hereinafter with reference to exemplary embodiments. However, the invention is not limited to these exemplary embodiments.

DETAILED DESCRIPTION

Figure 1:
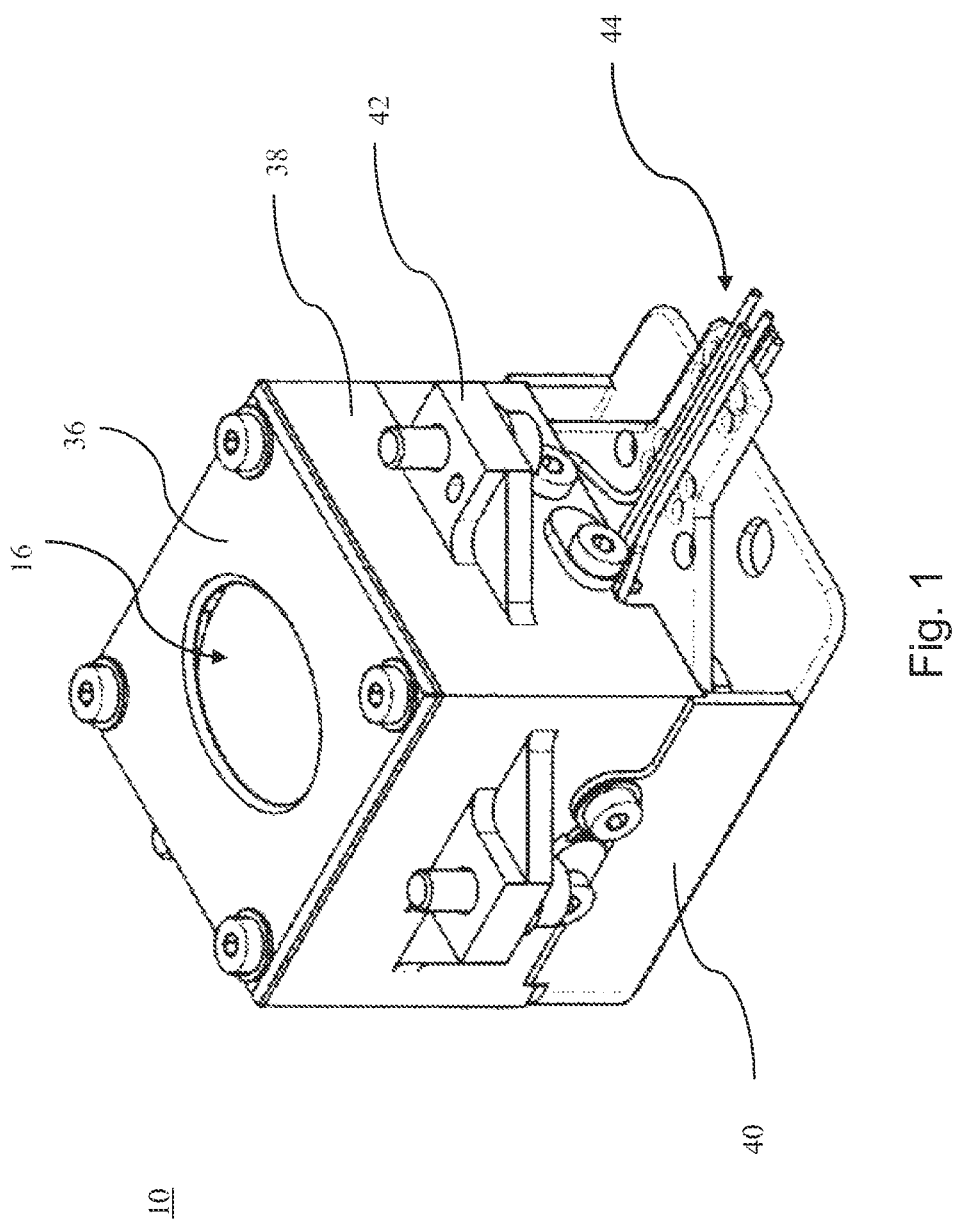
FIG. 1 shows a perspective view of an embodiment of a beam steering mirror device according to the invention.

In the following, functionally similar or identical elements may have the same reference numerals. Absolute values are shown below by way of example only and should not be construed as limiting the invention.

FIG. 1 shows in a perspective view a beam steering mirror device 10 with a fine steering mechanism according the present invention. The device 10 is built into a very compact housing consisting of a cover 36 with an opening for the mirror, an upper housing part 38 carrying the mirror mechanism with motors and sensors and a lower housing part 40 for completing the entire device housing. The upper housing part 38 further comprises mounting structures 42 for fixing the device 10 for example at a laser-based terminal or payload. Electrical connection cables 44 for the motors and sensors of the mirror mechanism leave the housing through openings between the upper and lower parts 38 and 40, respectively.

Figure 2:
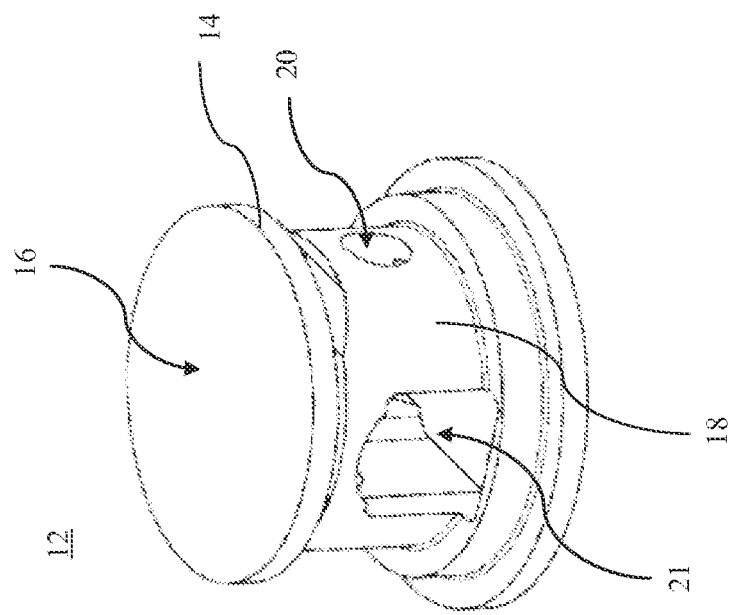
FIG. 2 shows an embodiment of an integral mirror design of a beam steering mirror device according to the invention.
Figure 2:
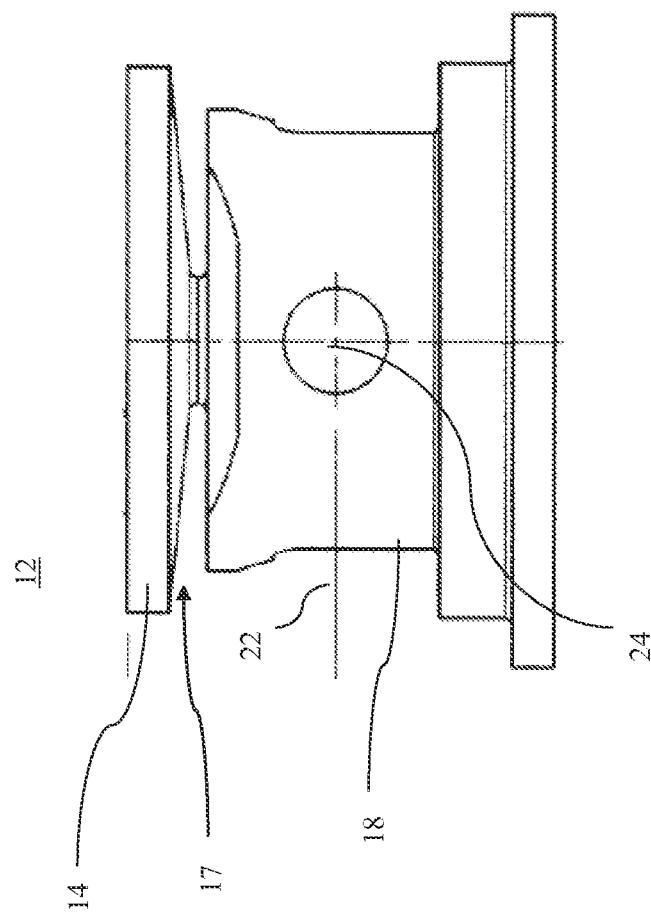

In the center of the mechanical housing of the device 10, a lightweight mirror 12 made from beryllium and as shown in FIG. 2 is suspended by a set of four flex pivots (not shown in FIG. 2). The integral mirror 12 comprises an optical part 14 and a mirror body 18 for suspending the mirror in the housing and carrying parts of the motors for moving the mirror 12. The optical part 14 is shaped like an essentially circular disk with one disk side forming the optical or reflecting surface 16 and with the opposite side 17 having a mushroom-shaped isostatic design in order to thermally de-couple the optical part 14 from the mirror 18, as it is shown in the side view of the mirror 12 on the left side of FIG. 2. The side view of the mirror 12 also illustrated the two rotation axes 22 and 24, which are arranged essentially perpendicular with respect to each other and located in a common plane. On the right side in FIG. 2, the mirror 12 is shown in a perspective view with the openings 20 and 21 for the biaxial suspension of the mirror 12 by means of flexible pivots. For each of the two rotation axes 22 and 24, two pivots on opposite sides of the mirror body 18 are provided. The openings 20 and 21 serve as seats for the flexible pivots. The mirror 12 itself is balanced so that its center of mass is located in the intersection point of the two rotation axes 22 and 24. The mirror body 18 forming the rotating part of the beam steering mechanism also carries four spherically shaped motor magnets 30 (shown in FIG. 3) of four motors 28 for motion around the two rotation or tilt axes 22 and 24.

Figure 3:
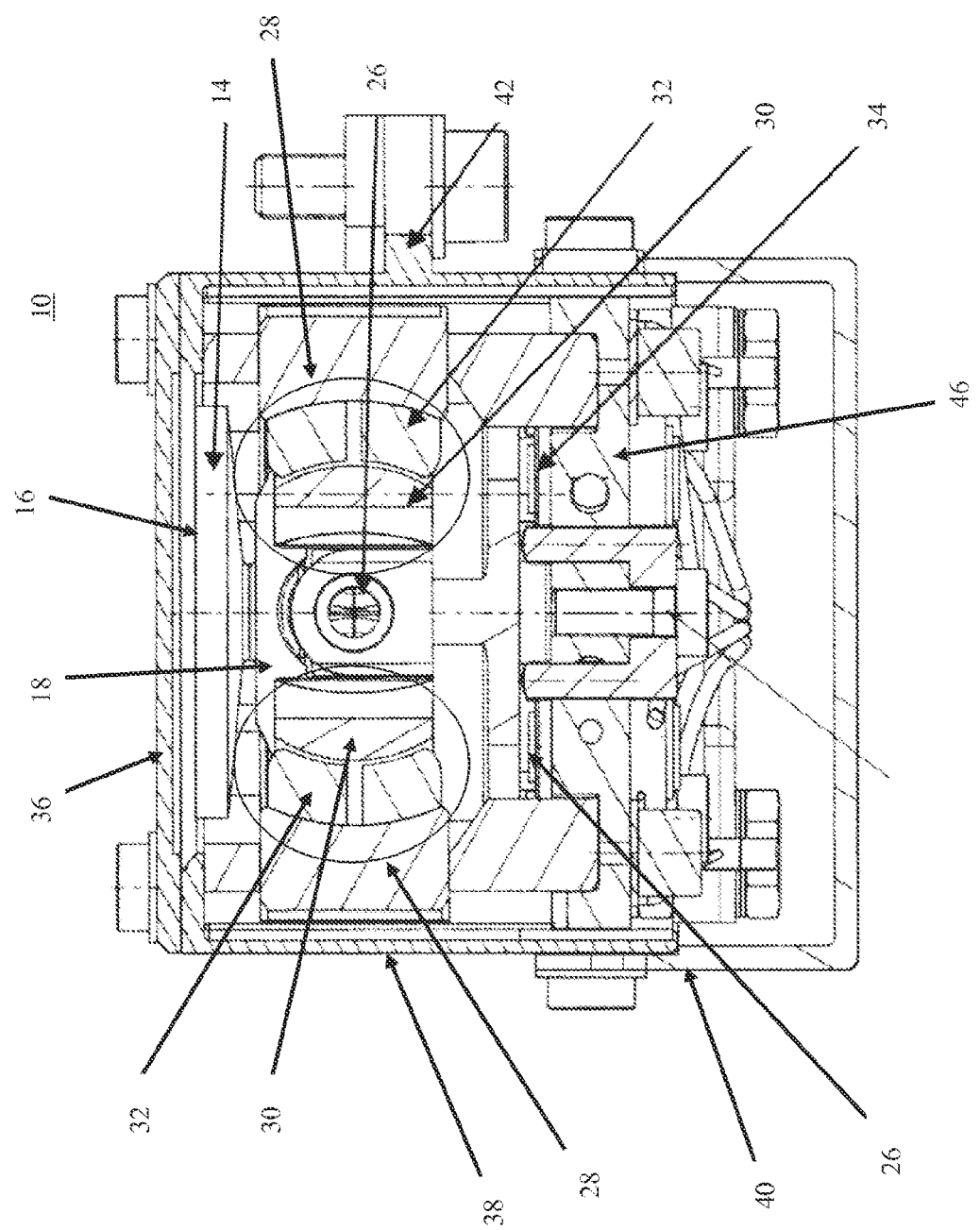
FIG. 3 shows in a cross-sectional and lateral view of the beam steering mirror device from FIG. 1 the beam steering mirror mechanism according to the invention in detail.

FIG. 3 shows the internal design of the beam steering mirror device 10 from FIG. 1 in detail. As can be seen, the motor stators (coils) 32 of the four motors 28 of the mechanism are mounted in the upper housing part 38, for example in the housing's corners and are located opposite to the four spherically shaped motor magnets 30, which are carried by the mirror body 18. Two motors 28 are provided for each rotation axis and are coupled in series so that no lateral forces can act during operation of the two motors on the mirror 12 and only a torque around the center of rotation is generated. Due to the concave spherical configuration of the motor stator coils 32, which complies with the shape of the convex motor rotor magnets 30, non-linearity effects due to air gap variations over the rotation angle of the mirror 12 can be avoided for nearly all combinations of rotation axes.

A high resolution eddy current sensor 34 is arranged in line with each motor 28 at the base 46 of the beam steering mirror mechanism, which is fixed at the upper housing part 38. The base 46 also carries the motor stators 32 and partly the flexible pivots 26 of the biaxial suspension of the mirror body 18. The sensors 34 are temperature-compensated and can be operated in a differential mode (differential read-out) to avoid measurement errors due to thermal influences. The sensors 34 allow a differential angle measurement of the rotation or tilting of the mirror 12 around its rotation axes 22 and 24. The measurements can be processed by an electronic controller (not shown) of the device 10 for controlling the electrical motors supply.

The steering mirror mechanism according to the present invention improves the performance of a beam steering mirror device with regard to steering precision and control bandwidth compared to other existing beams steering mirror concepts.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

REFERENCE NUMERALS AND ACRONYMS

10 beam steering mirror device
12 integral mirror, balanced, optical surface with isostatic support
14 optical part of the mirror 12
16 optical surface of the optical part 14
17 mushroom-shaped isostatic side
18 mirror body
20, 21 biaxial suspension
22 first rotation axis
24 second rotation axis
26 flexible pivot
28 motor
30 ball shaped (spherically shaped) motor rotor (magnet)
32 ball shaped (convex shaped) motor stator (coil)
34 high resolution eddy current sensor
36 cover of the device housing with opening for mirror
38 upper part of the device housing
40 lower part of the device housing
42 mounting structure of the device
44 electrical connection cables for motors 28 and sensors 34
46 base of the beam steering mirror mechanism
FSM Fine Steering Mechanism
KHz kilohertz

What is claimed is:

1. A beam steering mirror device comprising:
a mirror comprising an optical part with a reflecting or optical surface and a mirror body, wherein the optical part is thermally de-coupled from the body;
a biaxial suspension of the mirror body having two rotation axes, the two rotation axes are arranged perpendicular with respect to each other and are located in a common plane, wherein the suspension comprises a set of four flexible pivots with a pair of pivots assigned to each rotation axis, and wherein the mirror is arranged with respect to the biaxial suspension such that the mirrors center of mass is located in an intersection point of the two rotation axes;
motors configured to move the mirror body around the two rotation axes;
sensors configured to determine a tilting angle of the mirror; and
a housing containing the mirror, the biaxial suspension, the motors and the sensors,
wherein the optical part has a mushroom-shaped isostatic shape on a side opposite to the reflecting or optical surface and is coupled to the mirror body by the side having the mushroom-shaped isostatic shape.

2. The device of claim 1, wherein the motors comprise four motors, and wherein the mirror body carries four motor magnets, each forming a part of one of the four motors.

3. The device of claim 2, wherein motor stators are mounted in the housing with each motor stator located opposite to the one of the four motor magnets.

4. The device of claim 1, wherein the motors comprise two series coupled motors respectively configured to move the mirror body around an axis.

5. The device of claim 1, wherein the mirror is made from beryllium or AlBeMet.

6. A beam steering mirror device comprising:
a mirror comprising an optical part with a reflecting or optical surface and a mirror body, wherein the optical part is thermally de-coupled from the body;
a biaxial suspension of the mirror body having two rotation axes, the two rotation axes are arranged perpendicular with respect to each other and are located in a common plane, wherein the suspension comprises a set of four flexible pivots with a pair of pivots assigned to each rotation axis, and wherein the mirror is arranged with respect to the biaxial suspension such that the mirrors center of mass is located in an intersection point of the two rotation axes;
motors configured to move the mirror body around the two rotation axes;
sensors configured to determine a tilting angle of the mirror; and
a housing containing the mirror, the biaxial suspension, the motors and the sensors,
wherein the motors comprise four motors, and wherein the mirror body carries four motor magnets, each forming a part of one of the four motors,
wherein motor stators are mounted in the housing with each motor stator located opposite to the one of the four motor magnets, and
wherein the motor magnets are spherically convex shaped and the motor stators are concave shaped, and wherein the motor magnets are pivot-suspended and oriented with respect to the motor stators.

7. A beam steering mirror device comprising:
a mirror comprising an optical part with a reflecting or optical surface and a mirror body, wherein the optical part is thermally de-coupled from the body;
a biaxial suspension of the mirror body having two rotation axes, the two rotation axes are arranged perpendicular with respect to each other and are located in a common plane, wherein the suspension comprises a set of four flexible pivots with a pair of pivots assigned to each rotation axis, and wherein the mirror is arranged with respect to the biaxial suspension such that the mirrors center of mass is located in an intersection point of the two rotation axes;
motors configured to move the mirror body around the two rotation axes;
sensors configured to determine a tilting angle of the mirror; and
a housing containing the mirror, the biaxial suspension, the motors and the sensors,
wherein the sensors comprise four sensors, wherein the four sensors are arranged in line with the motors in the housing, wherein the four sensors are temperature compensated eddy current sensors, and two sensors are respectively provided to determine the tilting angle of the mirror around an axis and are operated in a differential mode.

8. A laser-based terminal or payload comprising:
a beam steering mirror device, which comprises
a mirror comprising an optical part with a reflecting or optical surface and a mirror body, wherein the optical part is thermally de-coupled from the body;
a biaxial suspension of the mirror body having two rotation axes, the two rotation axes are arranged perpendicular with respect to each other and are located in a common plane, wherein the suspension comprises a set of four flexible pivots with a pair of pivots assigned to each rotation axis, and wherein the mirror is arranged with respect to the biaxial suspension such that the mirrors center of mass is located in an intersection point of the two rotation axes;
motors configured to move the mirror body around the two rotation axes;
sensors configured to determine a tilting angle of the mirror; and
a housing containing the mirror, the biaxial suspension, the motors and the sensors,
wherein the optical part has a mushroom-shaped isostatic shape on a side opposite to the reflecting or optical surface and is coupled to the mirror body by the side having the mushroom-shaped isostatic shape.

* * * * *